March 13, 1956 C. M. PORTER ET AL 2,737,852
REARVIEW MIRROR ASSEMBLY FOR AUTOMOTIVE VEHICLES
Filed Oct. 10, 1952
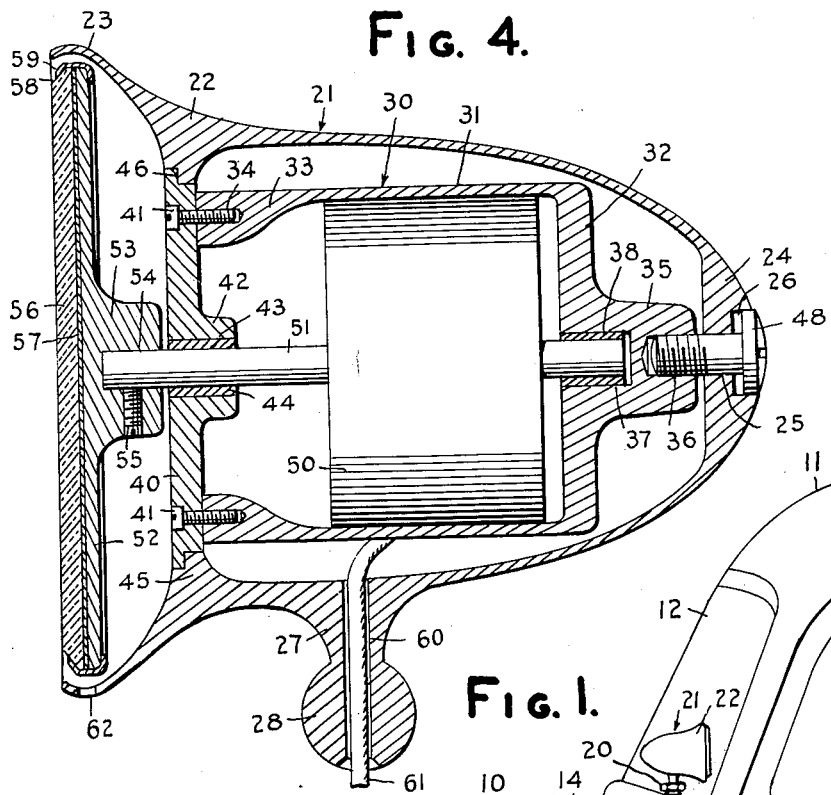
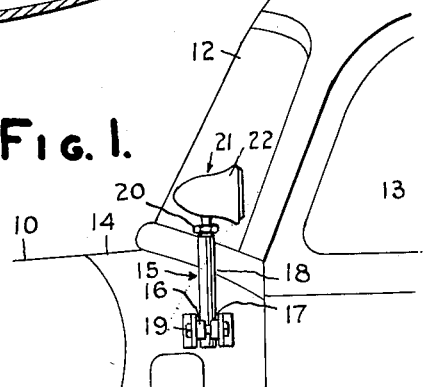
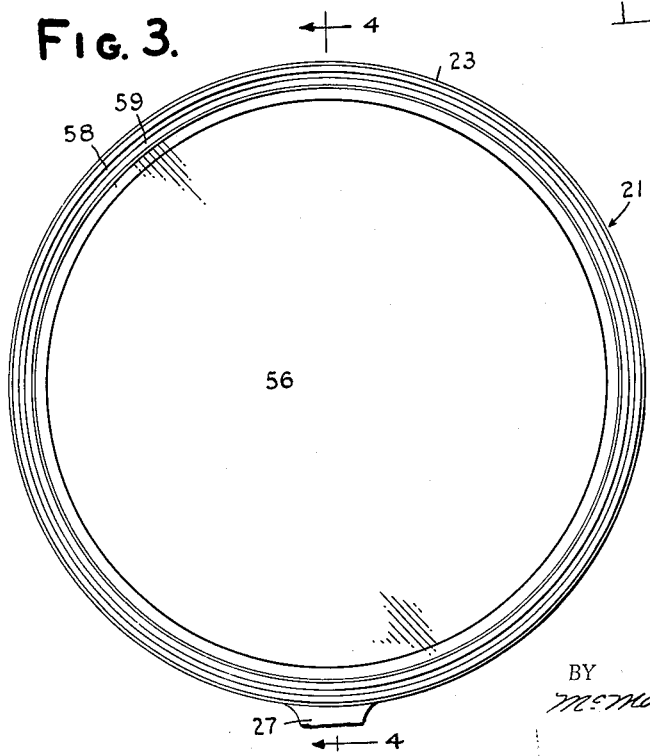
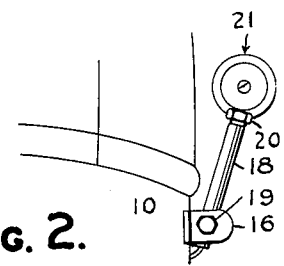
INVENTORS
CLARENCE M. PORTER
& WILLIAM H. PORTER.
BY
*McMorrow, Berman & Davidson*
ATTORNEY

United States Patent Office 2,737,852
Patented Mar. 13, 1956

2,737,852

REARVIEW MIRROR ASSEMBLY FOR AUTOMOTIVE VEHICLES

Clarence M. Porter, Center Moriches, and William H. Porter, Northport, N. Y.

Application October 10, 1952, Serial No. 314,054

1 Claim. (Cl. 88—98)

This invention relates to rear view mirror assemblies for automotive vehicles, such as passenger automobiles, trucks and busses, and more particularly to a rear view mirror assembly in which the mirror is kept free of rain, snow, sleet and other obscuring substances by centrifugal force incident to rapid rotation of the mirror about an axis perpendicular to its reflecting surface.

It is among the objects of the invention to provide an improved rear view mirror assembly for automotive vehicles which includes means for rapidly rotating the mirror about an axis perpendicular to the plane of its reflecting surface to discharge obscuring matter from the face of the mirror by centrifugal force; which is movable for adjustment of the mirror relative to the associated vehicle; and which is simple and durable in construction, economical to manufacture, easy to install, and neat and attractive in appearance.

Other objects and advantages will become apparent from a consideration of the following description and the appended claim in conjunction with the accompanying drawing wherein:

Figure 1 is a side elevational view of a fragmentary portion of an automotive vehicle showing a rear view mirror assembly illustrative of the invention operatively mounted on the vehicle;

Figure 2 is a fragmentary front elevational view of the vehicle and rear view mirror assembly illustrated in Figure 1;

Figure 3 is a rear elevational view of the mirror assembly illustrated in Figures 1 and 2; and Figure 4 is a longitudinal cross sectional view on the line 4—4 of Figure 3.

With continued reference to the drawing, the fragmentary portion of the vehicle, as illustrated in Figures 1 and 2, includes a portion of the engine compartment 10, a portion of the body 11 including a windshield 12 and a front window 13 enclosing the front and outer side of the driver's compartment in the vehicle, and a portion of a cowl 14 between the engine compartment 10 and the windshield 12.

A rear view mirror assembly, generally indicated at 15, is mounted on the cowl 14 at the driver's side of the vehicle and extends upwardly from the cowl, so that the mirror carried thereby is clearly visible to a driver seated in the driver's compartment of the vehicle, and the assembly is adjustable, so that the driver can angularly adjust the mirror to show a desired part of the road to the rear of the vehicle.

Apertured ears 16 and 17 are secured to the vehicle cowl 14 and extend outwardly therefrom in spaced apart and substantially parallel relationship to each other and a stem 18 has its lower end disposed between the ears 16 and 17 and adjustably connected to the ears by a bolt 19 extending through registering apertures in the ears 16 and 17 and through an aperture in the stem 18 or in a lug formation on the stem. At its end remote from the ears 16 and 17 the stem is provided with a ball socket and with external screw threads and a ball retaining nut 20 is threaded onto the screw threaded portion of the stem for retaining a ball formation in the stem socket.

A rotatable mirror assembly 21 is mounted on the upper end of the stem 18 and comprises a hollow housing 22 having one end open and surrounded by an outwardly flared annular flange 23 and convexly tapered to its other end to provide a housing of streamlined shape. The closed end of the housing is thickened, as indicated at 24, and provided with a centrally located screw hole 25 and a counterbore 26 at the outer end of the screw hole. The housing 22 is preferably of circular cross sectional shape and a projection 27 extends radially therefrom intermediate its length and terminates in a ball formation 28 which is secured in the ball socket at the upper end of the stem 18 by the nut 20.

In the arrangement illustrated, a fractional horsepower electric motor, generally indicated at 30, is mounted in the housing 22 for rotating the associated mirror, but it is to be understood that other mirror rotating devices, such as a vacuum operated motor, a compressed air operated motor or a wind driven motor may be substituted for the electric motor 30, without in any way exceeding the scope of the invention.

In the arrangement illustrated, the motor 30 includes a cylindrical housing 31 having one end open and an end wall 32 closing its other end. At its open end the annular wall of the housing 31 is thickened by an annular formation 33 provided with tapped holes 34 opening to the adjacent end of the housing and the end wall 32 is provided with an outwardly extending, centrally located boss 35 having a coaxially disposed tapped hole 36 opening to its outer end. At its inner end the boss 35 is provided with a coaxially disposed bearing recess 37 in which a motor bearing bushing 38 is disposed.

An end closure plate 40 in the form of a circular disc is secured to the housing 31 at the open end of the latter by screws 41 extending through apertures in the closure plate and into the tapped holes 34 at the corresponding end of the housing and this closure plate is provided with a centrally located boss 42 and a concentric bearing recess 43 receiving a motor bearing bushing 44. The housing 22 is provided near its open end with an internal annular bead 45 which surrounds the periphery of the closure plate 44 and is provided with an annular groove at its side nearest the open end of the housing to form a radial shoulder 46 around the bead. The closure plate 40 is provided with a peripheral groove forming a radial shoulder 47 and bearing against the shoulder 46 of the bead 45 and a screw 48 extends through the screw hole 25 in the closed end of the housing 22 and is threaded into the tapped hole 36 in the boss 35 on the closed end of the motor housing 31 to hold the shoulder 47 on the closure plate in firm engagement with the shoulder 46 on the bead 45 and thereby firmly mount the motor 30 in the housing 22. The head of the screw 48 is received in the counterbore 26, so that the screw head does not protrude outwardly of the smooth surface at the closed end of the outer housing.

Motor windings 50 of known construction are mounted in the motor housing 31 and a motor shaft 51 extends through the windings 50 and is journaled in the bearings 38 and 44, this shaft extending through the bearing bushing 44 and outwardly of the outer side of the closure plate 40.

A flat backing plate 52 of circular shape is disposed within the outwardly flared flange 23 at the open end of the housing 22 and has a diameter slightly less than the inside diameter of this flange. The backing plate is provided with a centrally located boss 53 having therein a recess 54 which is concentric with the plate 52 and receives the end of the motor shaft 51 extending outwardly of the closure plate 40. The backing plate is retained on the motor shaft by suitable means, such as the set screw 55 threaded through a radially disposed tapped hole in the boss 53 and bearing at its inner end against the shaft 51.

A mirror comprising a flat plate 56 formed of transparent material and of circular shape having a diameter substantially equal to the diameter of the backing plate 52 is disposed against the outer side of the backing plate. This transparent mirror plate carries a reflective coating 57 on its side adjacent the backing plate 52 and is beveled around its edge, as indicated at 58. A clamp ring 59 extends around the peripheral edges of the backing plate 52 and the mirror plate 56 and rigidly secures the mirror plate to the backing plate, also providing a seal for the reflective coating 57 of the mirror.

The projection 27 and ball formation 28 are provided with a continuous bore 60 and a motor extension cord 61 leads through this bore and through the stem 18 and is carried through an aperture in the body wall into the body of the vehicle where it is connected to a suitable source of electrical energy, such as the storage battery of the vehicle. A manually operated switch, not illustrated, is interposed in the extension cord 61 and mounted at a location convenient to the operator of the vehicle, as on the instrument panel of the vehicle, so that the operator or driver of the vehicle can control the operation of the motor 30.

The flange 23 is provided at its lowermost portion with an aperture 62 for drainage of liquid from the interior of the flange, and the rotational axis of the motor shaft 51 is perpendicular to the plane of the reflective surface of the mirror coating 57.

In clear weather it will not be necessary to operate the motor 30 to rotate the mirror 56 but, under adverse weather conditions, as during rain, snow or sleet or when water is being thrown from the road by passing vehicles, the motor 30 may be placed in operation to rapidly rotate the mirror 56, so that centrifugal force will cause water or other precipitation striking the outer face of the mirror to be thrown outwardly and off of the mirror, leaving the mirror clear and clean for use by the operator of the associated vehicle.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A vehicle rear view mirror assembly comprising, a hollow housing having an open end, means connected to said housing for mounting it on an automotive vehicle, an electric motor mounted in the closed portion of said housing and having a shaft, a backing plate disposed in the open end of said housing and mounted on said motor shaft, said backing plate being disposed concentrically of the axis of said shaft and having a mirror supporting surface perpendicular to the shaft axis, a mirror disposed in the open end of said housing against the mirror supporting surface of said backing plate and secured to the backing plate, and electrically conductive means connected to said motor and extending out of said housing for supplying electrical energy to the motor.

References Cited in the file of this patent
UNITED STATES PATENTS

| | | |
|---|---|---|
| 1,195,256 | Nonnenbruch | Aug. 22, 1916 |
| 1,318,839 | Breese | Oct. 14, 1919 |
| 1,388,214 | Tate | Aug. 23, 1921 |
| 1,508,761 | Normanville | Sept. 16, 1924 |
| 2,456,362 | Aves | Dec. 14, 1948 |